ically on the periphery of a disc-like base plate. Each of the teeth is
United States Patent [19]

Asada

[11] Patent Number: 5,018,276
[45] Date of Patent: May 28, 1991

[54] TOOTH STRUCTURE OF ROTARY SAW BLADE AND METHOD OF FORMING THE SAME

[75] Inventor: Tanehiko Asada, Shizuoka, Japan

[73] Assignee: Kaken Corporation Limited, Iwata, Japan

[21] Appl. No.: 514,157

[22] Filed: Apr. 25, 1990

[30] Foreign Application Priority Data

May 9, 1989 [JP] Japan ................................. 1-116820

[51] Int. Cl.⁵ .......................... B26B 9/00; B24D 7/00
[52] U.S. Cl. .................................. 30/347; 51/206 R; 76/115
[58] Field of Search ..................... 30/347, 348, 350; 51/71, 206 P, 206 R, 209; 125/13.01; 76/45, 115

[56] References Cited

U.S. PATENT DOCUMENTS 3,657,845  4/1972  Sekiya ..................... 51/206 R
4,267,814  5/1981  Benson et al. ............ 51/206 R
4,446,657  5/1984  Asaeda et al. ............ 51/206 R
4,547,998 10/1985  Kajiyama .................. 51/206 R
4,705,017 11/1987  Lewis ........................ 51/206 R
4,739,745  4/1988  Browning .................. 51/206 R
4,757,645  7/1988  Ozer et al. ................ 51/206 R
4,854,295  8/1989  Sakarcan .................. 51/206 R Primary Examiner—Douglas D. Watts
Assistant Examiner—Paul M. Heyrana
Attorney, Agent, or Firm—Dennison, Meserole, Pollack & Scheiner

[57] ABSTRACT

A tooth structure of a rotary saw blade includes a plurality of teeth arranged circumferentially on the peripheral portion of a disc-like base plate. Each of the teeth is trapezoidal in side view. The top surface of each of the teeth is generally rectangular or exposed to the outside, while the remaining surfaces are coated with ultra-hard abrasive grains.

6 Claims, 4 Drawing Sheets

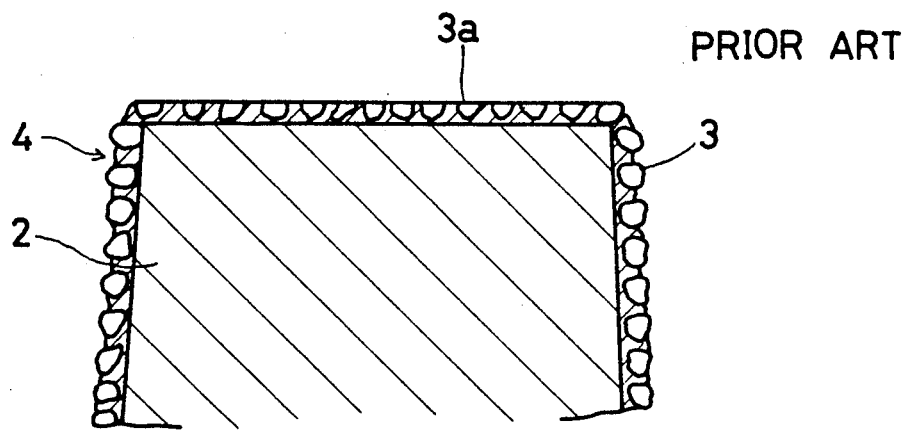
FIG.10 PRIOR ART
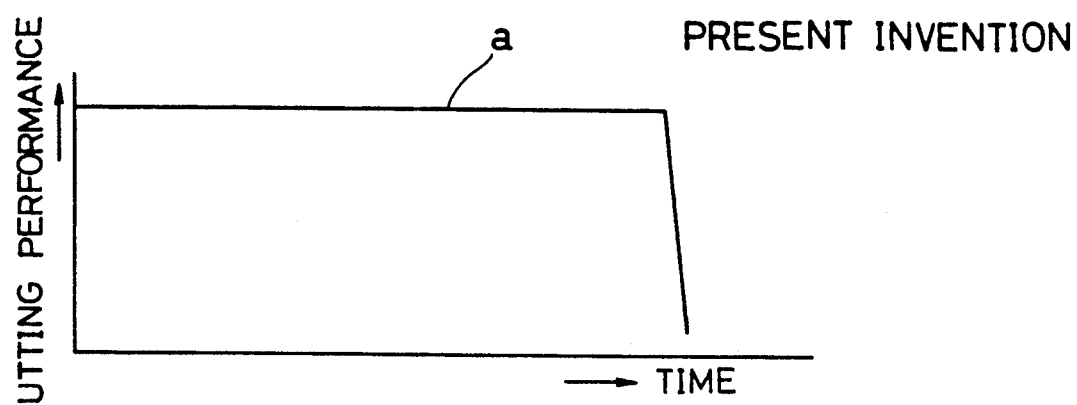
FIG.11 PRESENT INVENTION
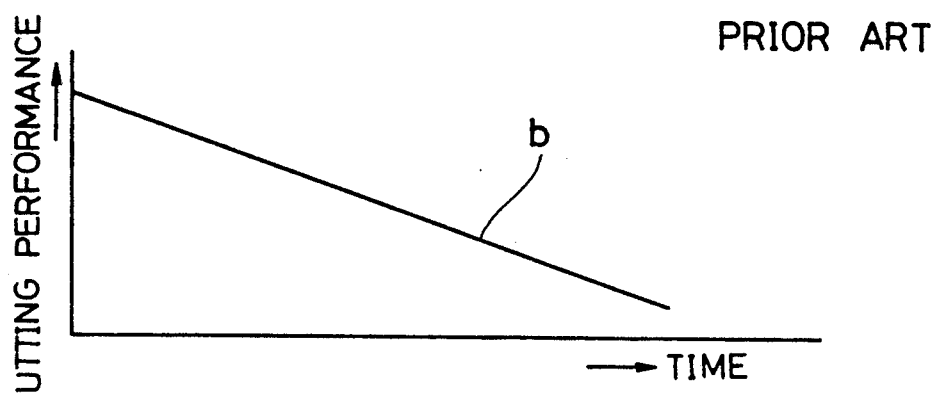
FIG.12 PRIOR ART

TOOTH STRUCTURE OF ROTARY SAW BLADE
AND METHOD OF FORMING THE SAME

BACKGROUND OF THE INVENTION

1. Field of the Invention

The present invention relates to a tooth structure of a rotary saw blade particularly used for cutting hard and brittle material such as glass, precious stones, tiles and bricks and to a method of forming the tooth structure.

2. Description of the Prior Art

A typical prior art saw blade design is shown in FIGS. 8 and 9. As shown therein, the rotary saw blade includes a disc-like base plate 1 and a plurality of teeth 2 formed on the peripheral portion of the base plate 1. The teeth 2 are spaced apart from each other by a predetermined pitch in a circumferential direction. On the entire surface of each of the teeth 2, diamond grains 3 of about No. 120 U.S. mesh are electrically deposited so as to form a toothed portion 4.

However, in the above conventional construction of the toothed portion, diamond grains 3a are deposited on the top surface 2a of each tooth 2 to cut a work. Therefore, as is apparent from the characteristic line b shown in FIG. 12, the cutting performance of the diamond grains 3a gradually degrades as they are worn.

Consequently, as shown in FIG. 12, the cutting performance is considerably degraded in the case that the diamond grains 3a have been worn out and the top surfaces of the toothed portion 4 become flat and smooth.

Thus, in the conventional construction, the diameter of the diamond grain is relatively small, and the state of wear of the diamond grains 3a cannot be recognized by visual observation. Further, the duration of life of the rotary saw blade is difficult to be recognized since its cutting performance gradually degrades. Therefore, the conventional construction has the drawbacks in that the users tend to miss the time of exchange or to misunderstand the blade for a defective one.

The above drawbacks are important factors for traders who rent such rotary saw blades.

SUMMARY OF THE INVENTION

It is, accordingly, an object of the present invention to provide an improved tooth structure of a rotary saw blade and a method of forming the same which can substantially constantly maintain the cutting performance until the ultra-hard abrasive grains are lost.

It is another object of the present invention to provide an improved tooth structure of a rotary saw blade and a method of forming the same which permit visual observation of the state of wear.

It is a further object of the present invention to provide an improved tooth structure of a rotary saw blade and a method of forming the same which permit exchange of the rotary saw blade at a proper time.

It is a still further object of the present invention to provide an improved tooth structure of a rotary saw blade and a method of forming the same which permit stable cutting operation.

According to the present invention, there is provided a tooth structure of a rotary saw blade having a disc-like base plate and a plurality of teeth arranged circumferentially on the peripheral portion of the base plate, each of said teeth being generally rectangular or trapezoidal in side view, characterized by the top surface of each of said teeth being exposed to the outside, and by the remaining surfaces being coated with ultra-hard abrasive grains.

The uncoated top surfaces are directed radially away from the base plate, and extend in a substantially circumferential direction with respect to the base plate.

It is preferable that the width of each of the teeth is twice the thickness thereof.

Further, it is preferable that the thickness of each of the teeth is 0.35 mm to 0.55 mm.

A method of forming a toothed portion of a rotary saw blade according to the present invention comprises the steps of:

forming a plurality of teeth on a disc-like base plate, each of the teeth being generally rectangular or trapezoidal in side view and being arranged circumferentially on the peripheral portion of the base plate;

coating substantially the entire surfaces of each of the teeth with ultra-hard abrasive grains; and removing substantially all of the ultra-hard abrasive grains on the top surface of each of the teeth so as to expose the top surface to the outside.

It is preferable that the ultra-hard abrasive grains are formed on the surfaces of the teeth by electroforming.

It is further preferable that the above method includes, prior to the electroforming step, the step of coating the disc-like base plate with an insulation material excluding the area corresponding to the tooth structure to be formed.

The invention will become more fully apparent from the claims and the description as it proceeds in connection with the drawings.

BRIEF DESCRIPTION OF THE DRAWINGS

FIG. 10 is a sectional view of tooth structure according to the prior art;

FIG. 11 is a graph showing the cutting performance of the tooth structure according to the Present invention; and FIG. 12 is a graph showing the cutting performance of the tooth structure according to the prior art.

DETAILED DESCRIPTION OF THE PREFERRED EMBODIMENTS

Figure 1:
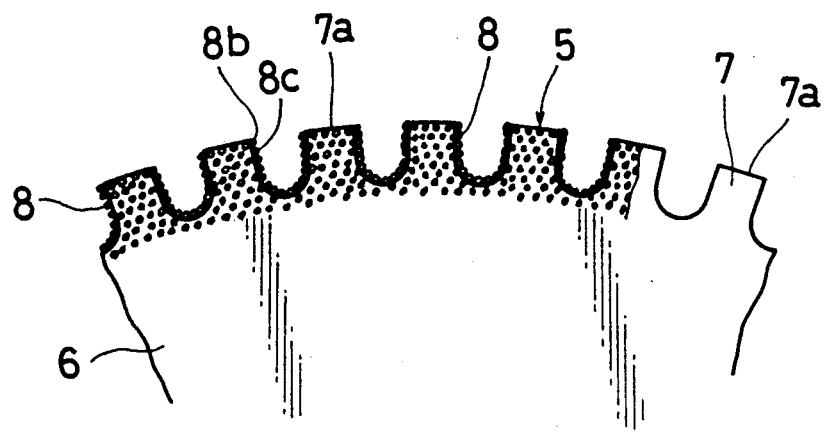
FIG. 1 is a side view of the essential part of a tooth structure of a rotary saw blade according to the present invention.

Referring to FIG. 1, there is shown a portion of a rotarY saw blade in side view to illustrate the present invention. As shown therein, the saw blade includes a disc-like base plate 6 and a toothed portion 5. The toothed portion 5 includes a plurality of teeth 7 formed circumferentially on the peripheral portion of the base plate 6. Each of the teeth 7 is generally rectangular in side view. Each of the teeth 7 has a top surface 7a directed radially away from base plate 6, and extending in a direction perpendicular to the radius of base plate 6, which is substantially in the circumferential direction with regard to base plate 6 in macroscopic view. Each top surface 7a is exposed to the outside, its remaining surfaces being coated with ultra-hard abrasive grains 8 such as diamond grains.

The above toothed portion 5 is formed by the method which will be hereinafter explained with reference to FIGS. 2 to 7.

Figure 2:
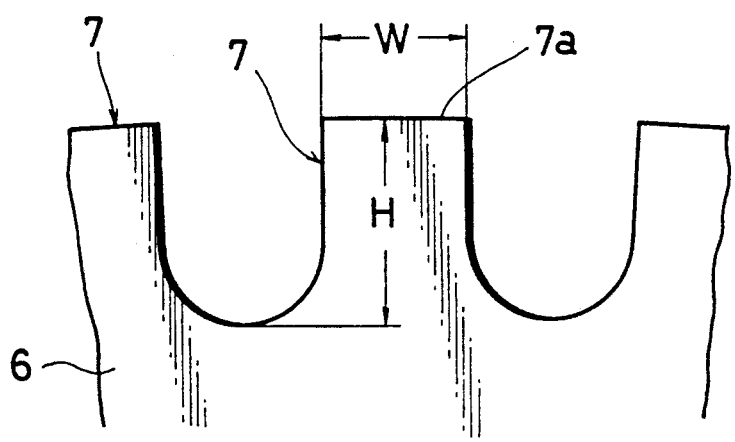
FIG. 2 is a fragmentary enlarged view showing the first step of forming the tooth structure according to the present invention.
Figure 3:
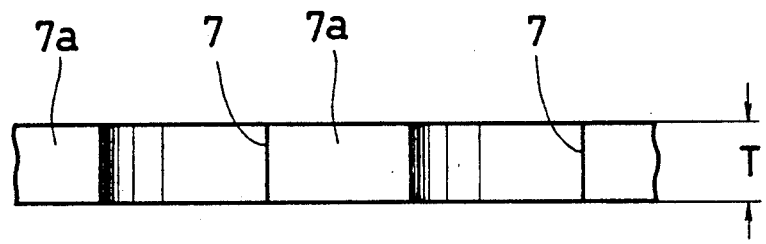
FIG. 3 is a plan view of FIG. 2.

Firstly, as shown in FIGS. 2 and 3, the base plate 6 is formed with a plurality of trapezoidal teeth 7 on the peripheral portion thereof. The base plate 6 is made from alloy tool steel plate having the thickness T of 0.35 mm to 0.55 mm, preferably of 0.4 mm.

The width W of each of the teeth 7 in the circumferential direction is determined to be twice the thickness T of the base plate 6. In this embodiment, the width W is 0.8 mm and the height H of each tooth 7 is 1.5 mm.

Figure 4:
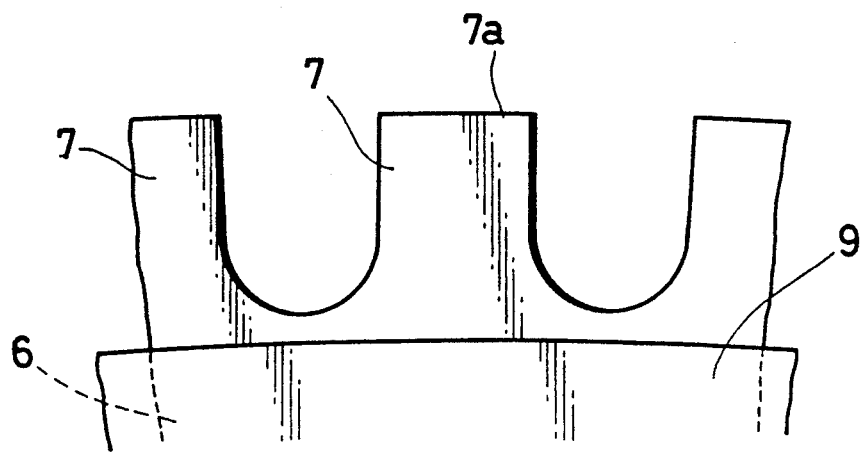
FIG. 4 is a fragmentary enlarged side view showing the second step of forming the tooth structure according to the present invention.
Figure 5:
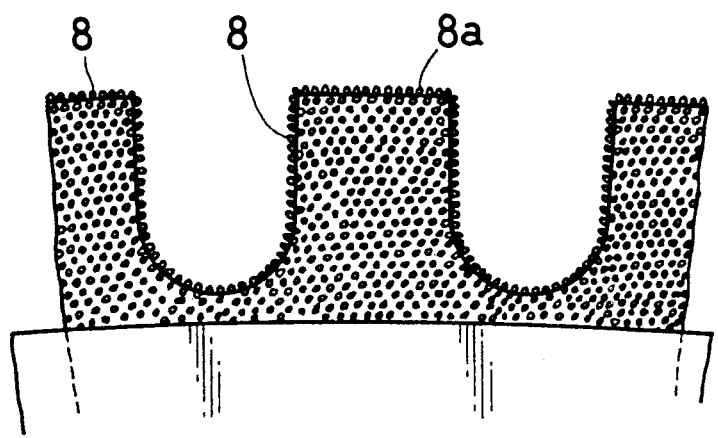
FIG. 5 is a fragmentary enlarged side view showing the third step of forming the tooth structure according to the present invention.

Secondary, as shown in FIG. 4, both of the sides of the base plate 6 is covered by insulation material 9 excepting the teeth 7 so that the teeth 7 are exposed to the outside.

The base plate 6 thus prepared is emerged into a plating bath (not shown) so that ultra-hard abrasive grains 8 are bonded to the entire surface of each tooth 7 by electroforming using electro-depositable metal such as nickel and chrome.

In the preferred embodiment, the ultra-hard abrasive grains 8 are diamond grains having the diameter corresponding to about No. 120 U.S. mesh.

Figure 6:
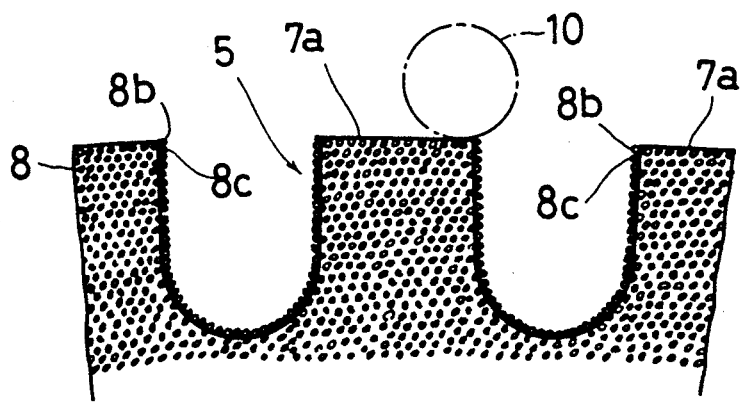
FIG. 6 is a fragmentary enlarged side view showing the fourth step of forming the tooth structure according to the present invention.
Figure 7:
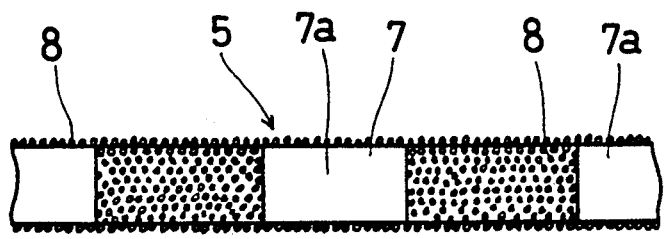
FIG. 7 is a plan view of FIG. 6.
Figure 8:
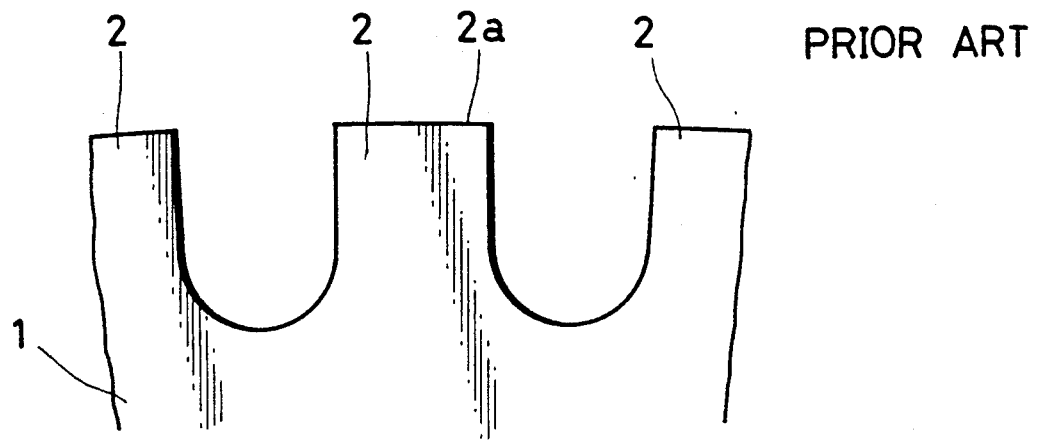
FIG. 8 and 9 are fragmentary enlarged side views each showing the steps of forming the tooth structure according to the prior art.
Figure 9:
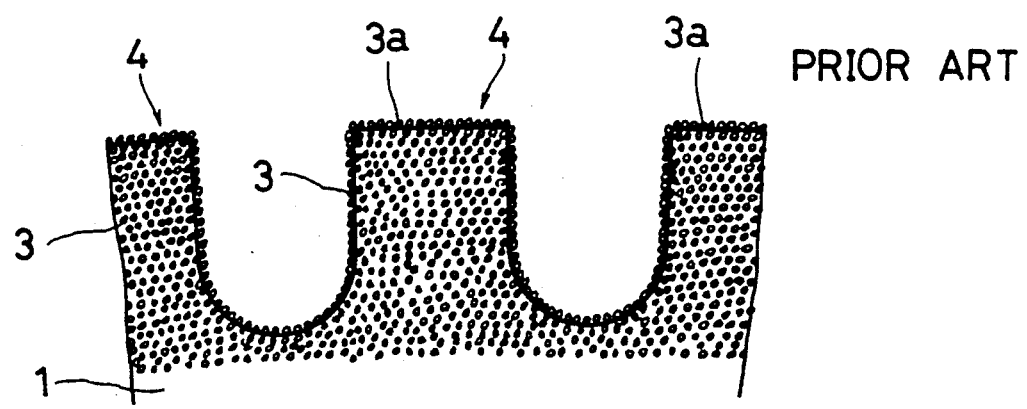

Finally, as shown in FIG. 6, ultra-hard abrasive grains 8a which are the part of the ultra-hard abrasive grains 8 bonded to the top surface 7a of each tooth 7 are removed by a grinding tool 10 so as to expose the surface 7a to the outside. Consequently, the toothed portion 5 as shown in FIG. 1 is obtained. It will be noted that removal of the ultra-hard abrasive grains 8a can be made by electric discharge machining.

In cutting a work, the top surface 7a of each of the teeth 7 and the abrasive grains 8b, which are the part of the ultra-hard abrasive grains 8 bonded to the peripheral portion of the surface 7a contact with the work to be cut. In this stage, abrasive areas 8b mainly cut the work while the top surface 7a is worn by its contact with the work. The wear rate of the top surface 7a substantially corresponds to that of the abrasive grains 8b.

After the part 8b is worn out, the abrasive grains 8c, which are the part of the ultra-hard abrasive grains 8 which are positioned on the base side of each tooth 7 subsequent to abrasive grains 8b, contact with the work so as to cut it, and further subsequent ultra-hard abrasive grains contact with the work and cut it in the same manner.

Thus, as shown by the characteristic line a in FIG. 11, the cutting performance of the toothed portion 5 is constant until all the ultra-hard abrasive grains 8 bonded to the teeth 7 have been worn out.

While the invention has been described with reference to the Preferred embodiment thereof, it is to be understood that modifications or variations may be easily made without departing from the scope of the present invention which is defined by the appended claims.

What is claimed is:

1. A rotary saw blade comprising a disc-like base plate and a plurality of circumferentially arranged teeth at the periphery of said base plate, each of said teeth having a top surface directed radially outwardly from said base plate and extending in a substantially circumferential direction with respect to said base plate, each of said teeth being coated with ultra-hard abrasive grains except for each said top surface which is not coated with said grains.

2. The saw blade as defined in claim 1, wherein the width of each of said teeth is twice the thickness thereof.

3. The saw blade as defined in claim 2 wherein the thickness of each of said teeth is 0.35 mm to 0.55 mm.

4. A method of forming a rotary saw blade, comprising the steps of:
    forming a plurality of teeth on a disc-like base plate, said teeth being circumferentially arranged at the periphery of said base plate, each of said teeth having a top surface directed radially outwardly from said base plate and extending in a substantially circumferential direction with respect to said base plate;
    coating all surfaces of each of said teeth with ultra-hard abrasive grains; and 5. The method as defined in claim 4 wherein said ultra-hard abrasive grains are formed on said surface of said teeth by electroforming.

6. The method as defined in claim 5 including, prior to the electroforming step, the step of coating said disc-like base plate with an insulation material excluding the area corresponding to said tooth structure to be formed.

* * * * *

UNITED STATES PATENT AND TRADEMARK OFFICE
CERTIFICATE OF CORRECTION

PATENT NO. : 5,018,276

DATED : May 28, 1991

INVENTOR(S) : Tanehiko Asada

It is certified that error appears in the above-identified patent and that said Letters Patent is hereby corrected as shown below:

Column 4, line 45, after "and" insert

-- removing substantially all said ultra-hard
abrasive grains from each said top surface
so as to expose each said top surface. --

Signed and Sealed this

Twenty-second Day of September, 1992

Attest:

DOUGLAS B. COMER

Attesting Officer       Acting Commissioner of Patents and Trademarks